United States Patent [19]
Gruber

[11] Patent Number: 5,776,006
[45] Date of Patent: Jul. 7, 1998

[54] GOLF PRACTICE ENHANCER

[76] Inventor: Isaac Gruber, 1500 Todd Street, #302, St. Laurent, Quebec, Canada, H4R 2H1

[21] Appl. No.: 690,865

[22] Filed: Aug. 1, 1996

[51] Int. Cl.[6] ............................................. A63B 69/36
[52] U.S. Cl. .................. 473/256; 403/344; 403/361; 403/362; 403/373
[58] Field of Search ........................... 473/256; 403/344, 403/361, 362, 373

[56] References Cited

U.S. PATENT DOCUMENTS

| | | |
|---|---|---|
| 1,585,190 | 3/1926 | Girdwood . |
| 2,608,409 | 8/1952 | Pinkerton . |
| 3,351,346 | 11/1967 | Strahan . |
| 3,647,220 | 3/1972 | Burkert et al. . |
| 3,680,870 | 8/1972 | Burnett et al. . |
| 3,716,239 | 2/1973 | Goudreau . |
| 4,037,668 | 7/1977 | Svejda . |
| 4,330,121 | 5/1982 | McCafferty . |
| 4,364,560 | 12/1982 | Gemmel . |
| 4,588,191 | 5/1986 | Stewart . |
| 5,178,394 | 1/1993 | Tanampai . |
| 5,527,039 | 6/1996 | Levesque ................... 473/256 X |

*Primary Examiner*—George J. Marlo
*Attorney, Agent, or Firm*—Darby & Darby

[57] ABSTRACT

A golf practice device in the form of an attachment to a golf club shaft. The attachment has preferably two weighted elements that are coupled together in such a manner that the spacing of the elements may be adjusted as desired, depending on the thickness of the shaft to which the device is to be attached. Thus, the device may be positioned at virtually any location or a tapered golf club shaft and also on golf club shafts of varying thicknesses. Once the desired spacing is selected, a frictional engagement device is used to secure the weighted elements at the desired spacing. The golf practice device is formed to be aerodynamically efficient, and preferably has substantially a smooth, rounded exterior surface. The locking device accordingly is formed such that it does not interfere with the aerodynamic efficiency of the device. Additionally, the locking device frictionally engages only the coupling that couples the weighted elements together without directly engaging the golf club shaft, and thus avoids damaging the surface of the shaft.

15 Claims, 2 Drawing Sheets

GOLF PRACTICE ENHANCER

BACKGROUND OF THE INVENTION

The present invention relates to an attachment to a golf club shaft. More particularly, the present invention relates to a practice device that may be used to enhance a golfer's swing; limber and strengthen the golfer's hands, wrists, arms, and shoulders; enhance and greatly eliminate wobbling of the pendulum effect of a putter swing; increase drive distance; and improve putting accuracy.

Weight attachments for golf clubs are known in the art. Such weights are designed to provide various benefits to the golfer. For example, weight attachments have been used to adjust the center of gravity of the golf club, or increase the weight of the golf club during practice to improve coordination and timing. Additionally, weights may be used to improve the user's rhythm, timing, and coordination during swinging. Weights can also be used to improve form and accuracy, permitting the golfer to achieve a greater distance in driving the ball.

Several prior art weights are coupled to the shaft of a golf club without any means for tightening the weight to the shaft. Accordingly, such weights do not permit easy adjustment along shafts that vary in thickness, or attachment to shafts of varying thicknesses. Other prior art weights include means for tightening the weight to the shaft, and therefore permit attachment to shafts of varying thicknesses. However, such tightening means generally include a screw that engages the shaft and therefore can damage the shaft. Moreover, prior art weights generally are not designed to be aerodynamically efficient, and therefore unduly add resistance in possibly nonuniform manner.

SUMMARY OF THE INVENTION

It is therefore an object of the present invention to provide an improved golf practice device that enhances a golfer's swing in a variety of ways and may be used on golf club shafts of virtually any thickness and positioned at practically any position along the shaft.

It is a related object of the present invention to provide an improved golf practice device that is easy to connect to a golf club shaft and which permits adjustability of position along the golf club shaft by sliding the device along the shaft and then securely tightening the device at the desired location without damaging the golf club shaft.

It is yet another related object of the present invention to provide an improved golf practice device that is easy to attach to golf clubs shafts of varying thicknesses without damaging the golf club shaft.

It is a further object of the present invention to provide an improved golf practice device having a sleek, aerodynamic design such that the device adds weight without otherwise slowing down the golfer's swing.

These and other objects of the present invention are accomplished by providing a golf practice device or enhancer having two, preferably substantially symmetrical portions that preferably remain coupled together during attachment to a golf club shaft. The device may be slid along the shaft and secured at virtually any position along the shaft. Once the desired position on the shaft is reached, the relative position of the portions is locked so that the device is secured in its desired place along the shaft. The relative position of the portions of the device is adjustable so that the device may be attached to shafts of different thickness, or at different locations along a golf club shaft of varying thickness. Preferably, the portions are locked in place relative to each other, but are in only frictional engagement with the golf club shaft, so that the surface of the golf club shaft is not marred by the device. Thus, the device can easily be positioned at any desired location along the length of a tapered golf club shaft, and on shafts of different thicknesses. Additionally, the golf practice device of the present invention is aerodynamically designed so that the presence of the device will not cause a wind resistance which could affect the golfer's swing.

These and other features and advantages of the present invention will be readily apparent from the following detailed description of the invention taken in conjunction with the accompanying drawings, wherein like reference characters represent like elements.

DETAILED DESCRIPTION OF THE INVENTION

Figure 1:
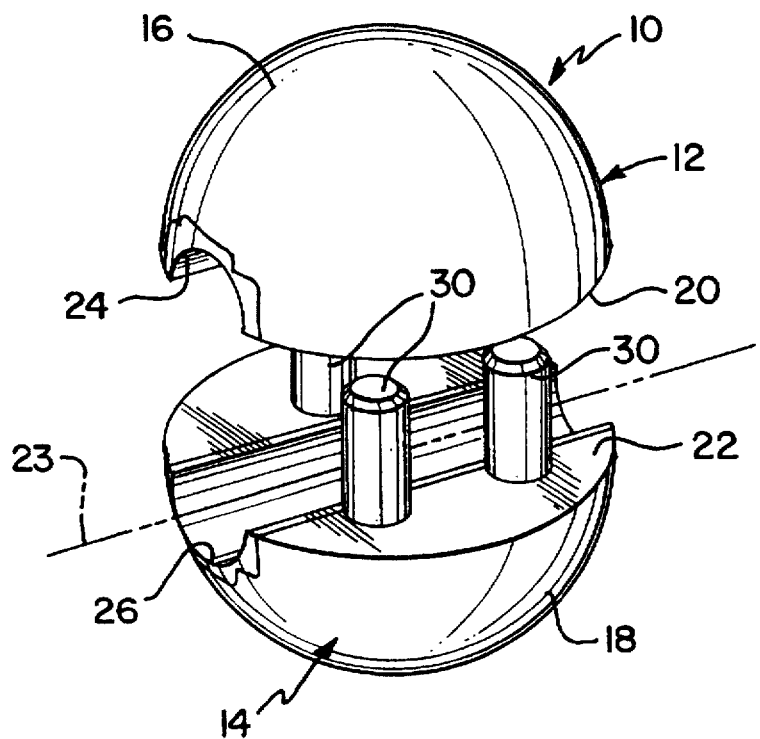
FIG. 1 is an exploded perspective view of a golf practice device in accordance with the present invention, shown detached from a golf club shaft.

The golf practice device of the present invention is in the form of a two-piece attachment to a golf club shaft that may be positioned along the length of the shaft as desired by the golfer in order to improve golfing techniques. A golf practice enhancer 10 formed in accordance with the principles of the present invention is shown in FIG. 1. Golf practice enhancer 10 is preferably formed from two weighted elements 12, 14. Weighted elements 12, 14 are preferably made of solid bronze, and together preferably weigh approximately one pound, six ounces. It will be understood that other materials, preferably metal alloys, may be used, and a variety of weights may also be used. The respective exterior surface 16, 18 of each of weighted elements 12, 14 is preferably smooth for maximized aerodynamic efficiency. Further, exterior surfaces 16, 18 are also rounded, and most preferably, are substantially spherical, for aerodynamic efficiency. Alternatively, weighted elements 12a, 14a may form a substantially ovoid golf practice enhancer 10a, having exemplary dimensions of 3.926 cm in length (i.e., along the golf club shaft to which golf practice enhancer 10 or 10a is attached) and 4.099 cm in width (i.e., in a direction substantially perpendicular to the golf club shaft). Although weighted elements 12, 14 are shown as substantially symmetrical in the preferred embodiment, they need not be symmetrical, as long as exterior surfaces 16, 18 are substantially smooth and uniform.

Figure 2:
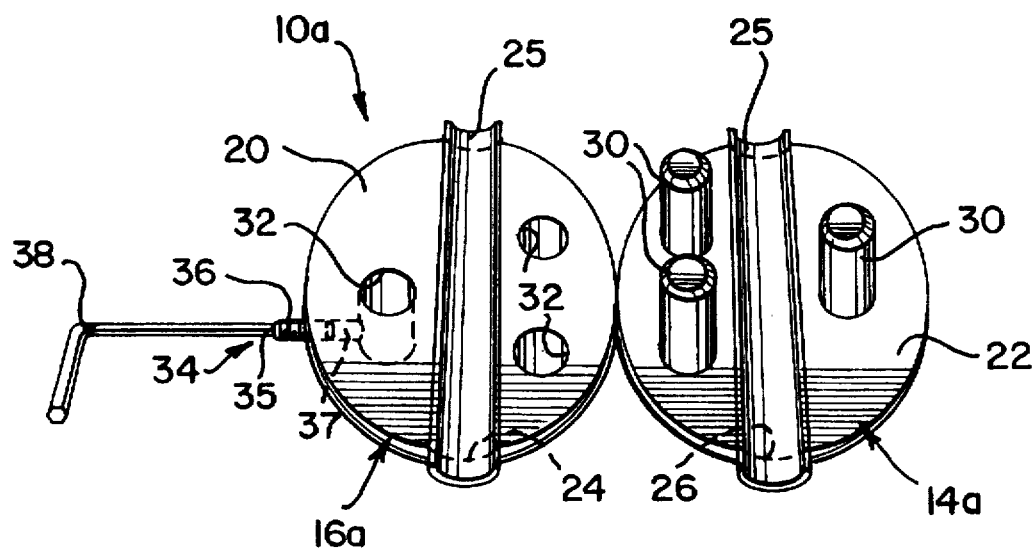
FIG. 2 is a perspective view of the portions of the golf practice device laid side by side to show the manner in which the portions are coupled and secured together.

Weighted elements 12, 14 each have along their respective interior surfaces 20, 22, half channels 24, 26 shaped for engaging a golf club shaft. Accordingly, half channels 24, 26 preferably have a uniform depth along longitudinal channel axis 23 which is substantially centered in interior shaft channel 27 (FIG. 3) formed by half channels 24, 26 when weighted elements 12, 14 are joined together about a golf club shaft. Interior shaft channel 27 preferably has a minimum diameter (i.e., the diameter when weighted elements 12, 14 are closest together) that corresponds to the narrowest portion of a narrow golf club shaft, e.g., approximately 1.2 cm. Channel axis 23 preferably is substantially coaxial with the axis of the golf club shaft to which golf practice enhancer 10 is attached. The surfaces of half channels 24, 26 may be coated with a coating that provides a frictional engagement with the golf club shaft while protecting against damaging the exterior surface of the golf club shaft. Preferably, an insert 25 is provided in each of channels 24, 26 to perform the function of a coating in the channel, i.e., to provide a frictional engagement with the golf club shaft while protecting against damaging the exterior surface of the shaft. Accordingly, insert 25 is preferably formed from a material such as PVC or rubber. As shown in FIG. 2, insert 25 is preferably provided in the form of two half tubular elements that may or may not extend beyond the ends of the channels.

It is noted that although interior surfaces 20, 22 are shown as substantially planar in FIGS. 1 and 2 (and thus are joined along a substantially straight seam 13 between weighted elements 12, 14, as shown in FIGS. 3–6), interior surfaces 20, 22 may have any desired shape as long as the shapes of interior surfaces 20, 22 interengage so that weighted elements 12, 14 fit together smoothly and easily.

Weighted elements 12, 14 are coupled together by a coupling 28 formed along interior surfaces 20, 22 so that coupling 28 does not affect the smooth exterior and aerodynamic efficiency of golf practice enhancer 10. Coupling 28 may be formed of one or more pins 30 formed on at least one of interior surfaces 20, 22 (as shown in FIG. 1, in interior surface 22) that fit in respective correspondingly-sized bores 32 in the other of interior surfaces 20, 22 (as shown in FIGS. 1 and 2, in interior surface 20). It is noted that each of interior surfaces 20, 22 may have at least one pin and also at least one bore so that not all of the pins are on one of the weighted elements while all of the bores are in the other of the weighted elements. Preferably, coupling 28 permits sufficient adjustment such that weighted elements 12, 14 may be drawn apart, without being separated (so that realignment, required after separation, is not required), to insert a golf club shaft within interior shaft channel 27, and then drawn together to be securely fastened at a desired location along the golf club shaft. Accordingly, in the preferred embodiment, pins 30 are of a sufficient length and bores 32 are of a sufficient depth to permit a wide degree of adjustment of the spacing between weighted elements 12, 14. Preferably, pins 30 are at least approximately 1.251 cm in length (i.e., the height of the pins 30 from the interior surface 20, 22 from which pins 30 extend) and bores 32 are at least approximately 1.252 cm in depth. The width (i.e., diameter if pins 30 are substantially cylindrical as shown) of pins 30 is preferably approximately 0.600 cm and the width (i.e., diameter if pins 30 are substantially cylindrical as shown) of bores 32 is preferably approximately 0.603 cm. Golf practice enhancer 10 may thus be easily and quickly attached to a golf club shaft.

In order to maintain weighted elements 12, 14 at a desired spacing such that golf enhancer device 10 is securely attached to a golf club shaft, a locking device 34 is provided, as shown in FIG. 2. Locking device 34 is formed such that it does not affect the smooth exterior and aerodynamic efficiency of golf practice enhancer 10. Thus, locking device 34 is preferably formed within the interior of golf practice enhancer 10 (i.e., between exterior surfaces 16, 18 and interior surfaces 20, 22) and preferably does not protrude from exterior surfaces 16, 18 of golf practice enhancer 10. Further, locking device 34 is designed to lock to each other the portions of golf practice enhancer 10, without directly engaging the golf club shaft, i.e., to maintain weighted elements 12, 14 together without risking damage to the golf club shaft.

Figure 3:
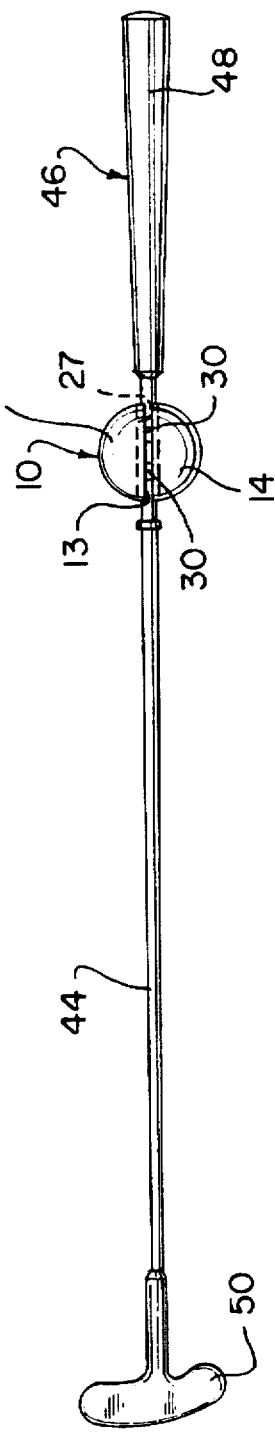
FIG. 3 is an elevational view of a putter with the golf practice device of the present invention mounted thereon in a first position.

As shown in FIGS. 2 and 3, locking device 34 includes a setscrew 36 fitted within a transverse bore 37 (shown in phantom in FIG. 2) in the one of weighted elements 12, 14 in which bores 32 of coupling 28 are formed (as shown, in weighted element 12). Transverse bore 37 is in communication with one of bores 32 so that setscrew 36 may extend into bore 32 to engage the pin 30 inserted therein. Accordingly, setscrew 36 of device 34 engages coupling 28 to maintain coupling 28 at a desired setting without engaging and, therefore, without damaging the golf club shaft. Weighted elements 12, 14 are thereby locked together with their surfaces 20 and 22 at a desired spacing so that golf practice enhancer 10 is securely clamped to the golf club shaft. The length of setscrew 36 preferably is selected such that exterior end 35 of setscrew 36 is substantially flush with the exterior surface of the weighted element in which transverse bore 37 is formed when setscrew 36 sufficiently engages coupling 28 to securely attach golf practice enhancer 10 to a golf club shaft. Accordingly, setscrew 36 will not adversely affect the aerodynamic efficiency of golf practice enhancer 10. Frictional engagement device 34 further includes a tightening device 38 for adjusting the position of setscrew 36 within transverse bore 37. As shown, tightening device 38 is a hex key that fits within an exterior socket in exterior end 35 of setscrew 36. Frictional engagement device 34 of the present invention thus is easy to use and permits secure, rapid connection of golf practice enhancer 10 to a golf shaft without interfering with the benefits of the present invention.

Because, as described above, golf practice enhancer 10 may easily be positioned on golf club shafts of varying thicknesses, golf practice enhancer 10 may be used on any of the golf clubs typically used during a game of golf, i.e., on either the putter, any of the irons, or any of the woods. Moreover, because the relative positions of weighted elements 12, 14 may easily be adjusted while remaining coupled together, golf practice enhancer 10 may be slid along the golf club shaft to which it is attached to vary its position along the golf club shaft.

Figure 4:
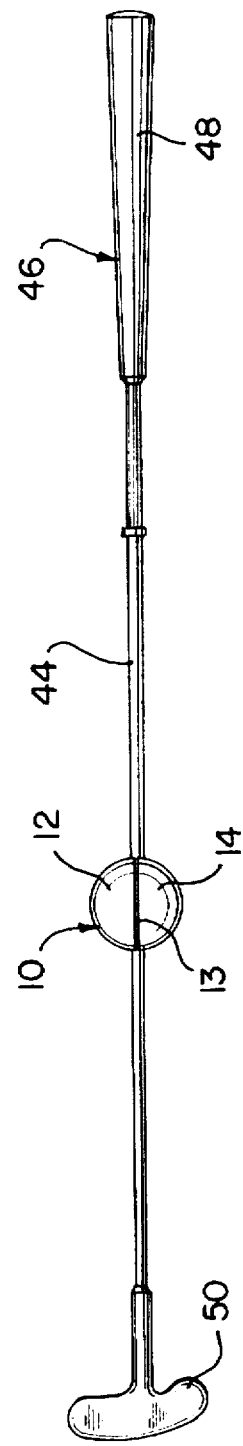
FIG. 4 is an elevational view similar to that of FIG. 3, but with the practice device in a second position.
Figure 5:
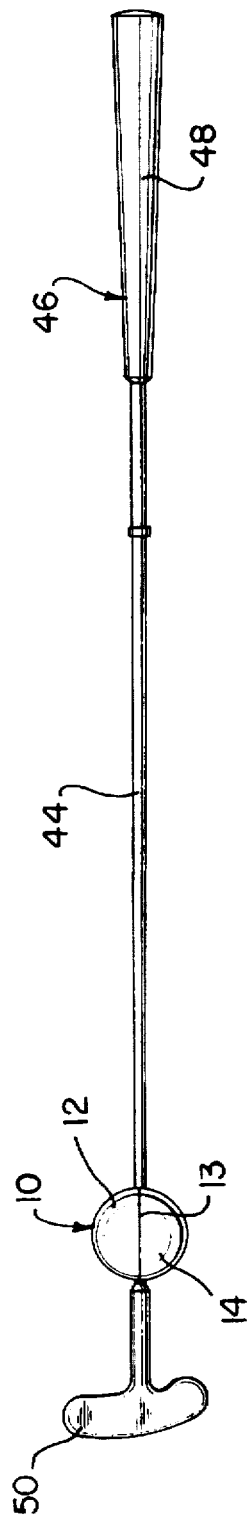
FIG. 5 is an elevational view similar to that of FIGS. 3 and 4, but with the practice device in a third position.

As shown in FIGS. 3–5, golf practice enhancer 10 may be positioned at virtually any location along shaft 44 of exemplary golf club putter 46. Although golf practice enhancer 10 is shown on a putter, as discussed above, golf practice enhancer 10 may be attached to irons and woods as well. The position of golf practice enhancer 10 may be adjusted along the length of the golf club shaft to which it is attached to establish the center of gravity and most comfortable position for the golfer using the device. Additionally, the position of golf practice enhancer 10 affects the effect it has during practice. When attached nearest the handle 48 of the golf club, as shown in FIG. 4, the added weight of golf practice enhancer 10 is most greatly felt. Thus, in the position shown in FIG. 4, golf practice enhancer 10 may be used to limber and strengthen the hands, wrists, arms, and shoulders of the golfer using the device, especially when used before a game. Golf practice enhancer 10 may be slid along the shaft 44 to an intermediate position, as shown in FIG. 5, to the optimum position for the golfer using the device for enhancing and greatly eliminating wobbling of the pendulum effect of a swing (typically during putting). When attached nearest the head 50 of a putter, a shown in FIG. 6, golf practice enhancer 10 will greatly improve accuracy.

As may be seen by comparing FIGS. 3–5, the width of seam 13 varies depending on the location of golf practice enhancer 10 because of the varying thickness of shaft 44. Thus, when golf practice enhancer 10 is near handle 48, and thus at a relatively thick portion of shaft 44, seam 13 is wide enough to permit pins 30 to be seen. In contrast, when golf practice enhancer 10 is near head 50, and thus at a relatively thin portion of shaft 44, seam 13 is so narrow that weighted elements 12, 14 are substantially abutting. In an intermediate position, such as shown in FIG. 5, the seam is wider than as shown in FIG. 6, but not necessarily so wide as to permit pins 30 to be seen.

While the foregoing description and drawings represent the preferred embodiments of the present invention, it will be understood that various additions, modifications and substitutions may be made without departing from the spirit and scope of the present invention as defined in the accompanying claims. In particular, it will be clear that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A golf practice device for attachment to a golf club shaft, said device comprising:

a first weighted element having a substantially smooth exterior surface and an interior surface;

a second weighted element having a substantially smooth exterior surface and an interior surface, said interior surface of said second weighted element facing said interior surface of said first weighted element when said golf practice device is attached to a golf club shaft;

a coupling having a first part formed along said interior surface of said first weighted element and a second part formed along said interior surface of said second weighted element, said coupling detachably coupling said first and said second weighted elements, with said interior surfaces facing each other, said coupling permitting adjustment of the relative positions of said first and second weighted elements;

an interior shaft channel defined between said first and second weighted elements along said interior surfaces of said first and second weighted elements, said interior shaft channel being adapted to receive a golf club shaft; and a locking device positioned in one of said first and second weighted elements and adapted to engage said coupling to lock said first and second weighted elements in position with respect to each other, said locking device releasably locking said first and second weighted elements to each other for embracing therebetween a golf club shaft without said locking device extending into said interior shaft channel.

2. A golf practice device as in claim 1, wherein said exterior surfaces of said first and second weighted elements are rounded.

3. A golf practice device as in claim 2, wherein said interior surfaces of said first and second element are substantially planar and substantially parallel to each other when said first and second elements are coupled together by said coupling.

4. A golf practice device as in claim 3, wherein said coupling permits adjustment of the spacing between said substantially planar interior surfaces of said first and second weighted elements.

5. A golf practice device as in claim 1, wherein said exterior surfaces of said first and second weighted elements, when coupled together by said coupling, form a substantially smooth, rounded exterior of said device.

6. A golf practice device as in claim 5, wherein said exterior surfaces of said device are shaped to minimize aerodynamic drag.

7. A golf practice device as in claim 1, wherein said first and second weighted elements are substantially symmetrical.

8. A golf practice device as in claim 1, wherein said coupling comprises at least one pin in at least one of said first and second weighted elements, and a corresponding bore in the other of said first and second weighted elements for receiving therein said at least one pin.

9. A golf practice device as claim 8, wherein:

a transverse bore is defined adjacent to and in communication with said at least one bore; and said locking device is positioned in said transverse bore and engages said at least one pin received in said at least one bore in communication with said transverse bore to thereby fix the relative position of said first and second weighted elements.

10. A golf practice device as in claim 9, wherein said locking device comprises a setscrew.

11. A golf practice device as in claim 9, wherein said locking device is positioned in said first weighted element and does not extend outwardly beyond said exterior surface of said first weighted element when said first and second weighted elements are locked together to clamp a golf club shaft therebetween.

12. A golf practice device as in claim 1, wherein said interior shaft channel is rounded to conform to the exterior of a golf club shaft, said interior shaft channel further comprising an insert formed from a material that provides frictional engagement with a golf club shaft while protecting against damaging the exterior surface of the golf club shaft.

13. A golf practice device as in claim 12, wherein said insert comprises a first tubular element positioned within the interior surface of said first weighted element and a second tubular element positioned within the interior surface of said second weighted element.

14. A golf practice device as in claim 12, wherein said insert is formed from PVC.

15. A golf practice device as in claim 12, wherein said insert is formed from rubber.

* * * * *